United States Patent [19]
Schrag et al.

[11] Patent Number: 4,765,235
[45] Date of Patent: Aug. 23, 1988

[54] MONITORING SYSTEM FOR DETECTING MALFUNCTION OF KNOTTING MECHANISM ON A CROP BALER

[75] Inventors: Thomas G. Schrag, Hesston, Kans.; Charles F. Hood; Scott A. Morton, both of Ranchester, Wyo.; Kurt Graber, Moundridge, Kans.

[73] Assignee: Hay & Forage Industries, Hesston, Kans.

[21] Appl. No.: 38,779

[22] Filed: Apr. 15, 1987

[51] Int. Cl.⁴ .......................... B65B 13/22; B65B 13/18
[52] U.S. Cl. ............................................ 100/3; 100/4; 100/8; 100/99
[58] Field of Search ........................ 100/4, 3, 8, 16, 81, 100/88, 99, 19 R, 48, 189; 340/677; 56/341, 343, 432, 433, 445

[56] References Cited

U.S. PATENT DOCUMENTS

| | | |
|---|---|---|
| 4,106,267 | 8/1978 | White . |
| 4,108,062 | 8/1978 | White . |
| 4,196,661 | 4/1980 | Yatcilla et al. ............................ 100/4 |
| 4,624,179 | 11/1986 | Yves et al. ............................... 100/4 |
| 4,656,931 | 4/1987 | Van Den Bossche et al. ......... 100/4 |
| 4,674,403 | 6/1987 | Bryant et al. ....................... 100/88 X |

Primary Examiner—Andrew M. Falik
Attorney, Agent, or Firm—Hovey, Williams, Timmons & Collins

[57] ABSTRACT

During the process of binding a bale of crop material with binding twine in a crop baler, malfunction of the knotter is checked once upon completion of the binding sequence for one bale, and then a second time after the twine has been prepared by the knotter for formation of the next bale. The monitoring system is particularly appropriate for a double knotting mechanism in which each knotter operates through two complete operating cycles during each actuation thereof, a first cycle to complete a knot associated with the just finished bale, and a second cycle to complete a knot in two separate strands of twine to prepare the same for the next successive bale. The position of a slack takeup arm moved by the binding twine between a number of positions during the double knotting sequence is monitored by the electronic portion of the system, including a computer, so that if the takeup arm is located improperly at one of the critical checking times in the sequence, such condition is reported to the operator through a visual display in the tractor which tows the baler.

24 Claims, 9 Drawing Sheets

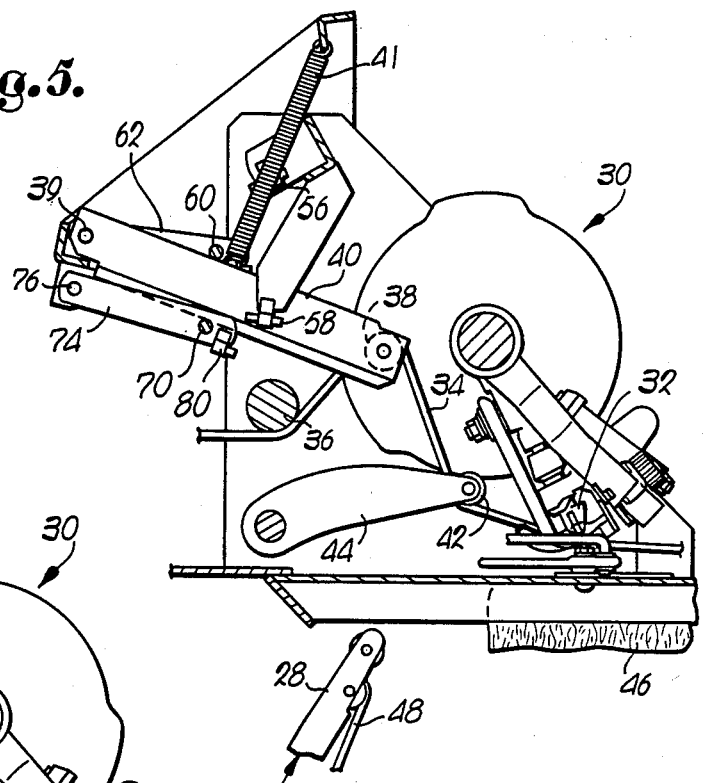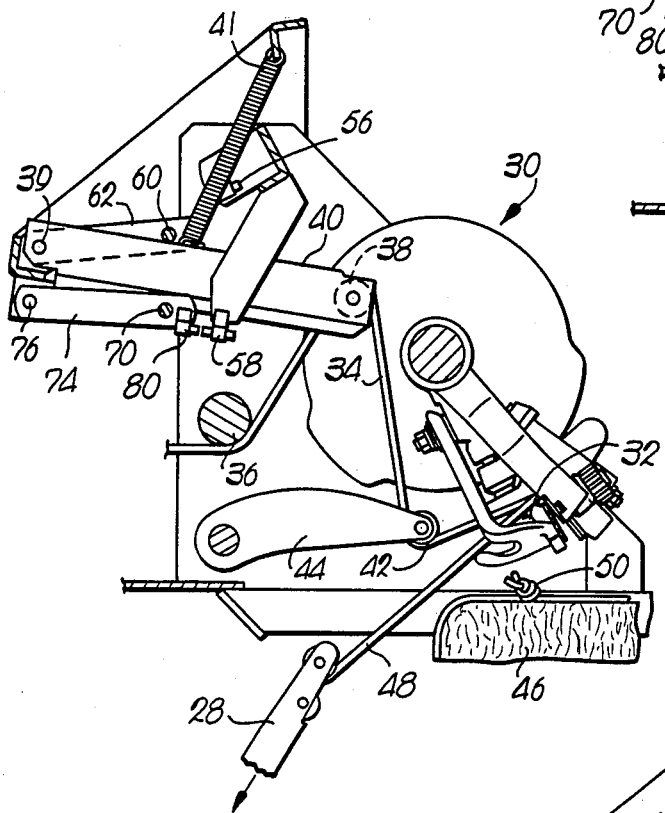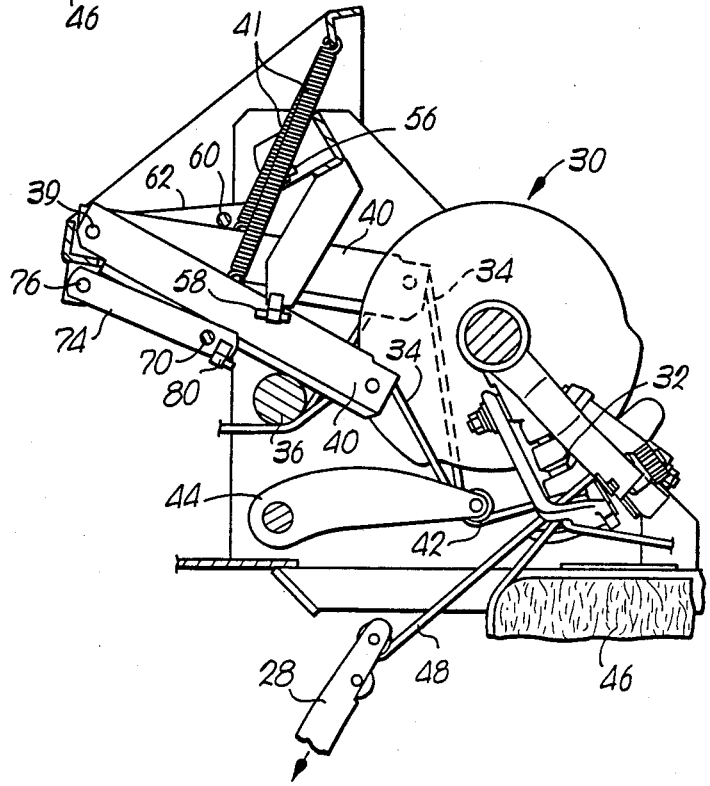

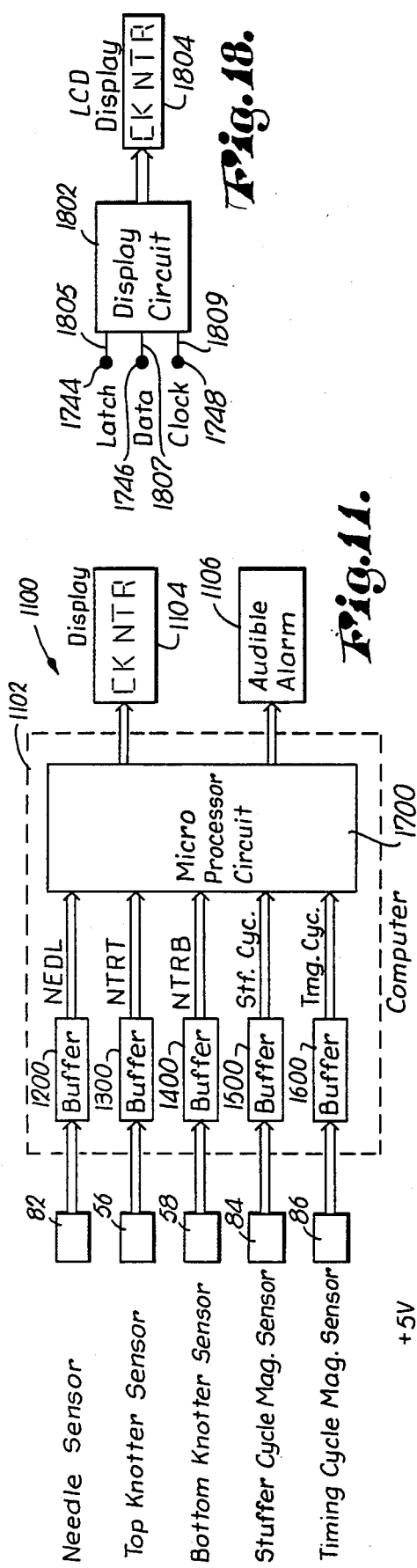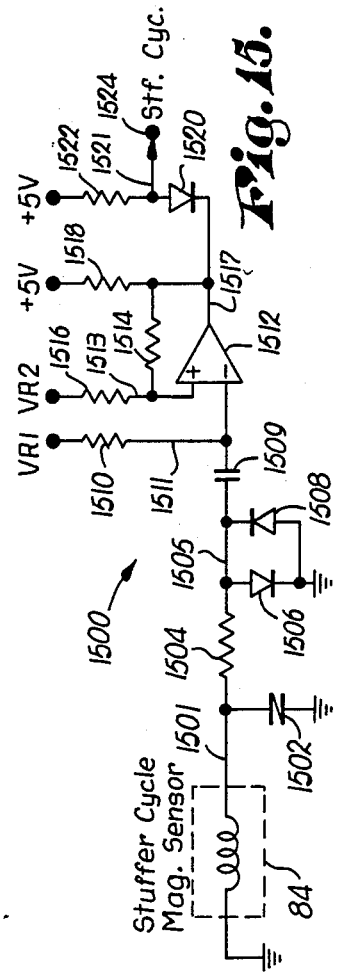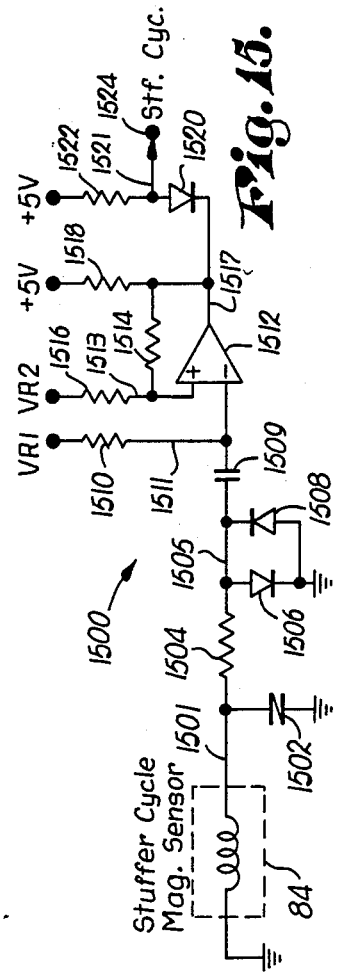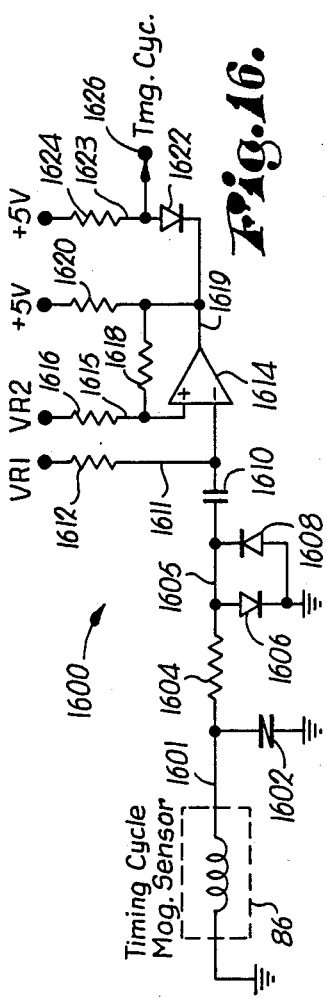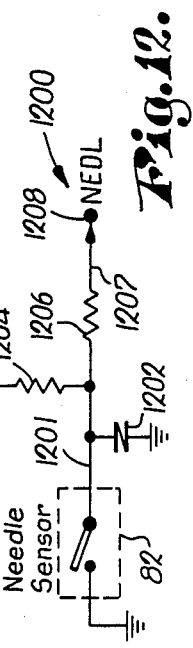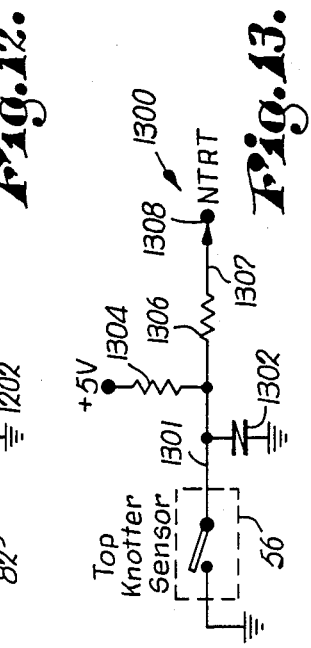

MONITORING SYSTEM FOR DETECTING MALFUNCTION OF KNOTTING MECHANISM ON A CROP BALER

TECHNICAL FIELD

This invention relates to crop balers and, more particularly, to a system for detecting the malfunction of one or more knotters associated with the binding mechanism of such a baler and reporting the condition to the operator of the towing tractor.

BACKGROUND

U.S. Pat. No. 4,196,661 discloses and claims a monitor for the knotting mechanism of a crop baler. In that patent, an upwardly springbiased slack takeup arm swings up to close a switch or raise a signal flag when the binding twine breaks or otherwise malfunctions and loses its ability to hold the takeup arm in its lowered position.

While that mechanism has proven acceptable, it is not generally capable of giving the operator a clear indication of the opposite malfunction extreme, i.e., when the twine stays tensioned when it is not supposed to, such as when the bill hook of the knotting mechanism becomes improperly wrapped with the twine and cannot be released. Moreover, the system of the '661 patent, particularly where the signal means comprises mechanical flags, is not particularly convenient for the operator, since with the use of signal flags, the operator must look over his shoulder or glance in a rearview mirror to notice that the signal flag has been operated. Furthermore, in the same respect, since the baler is provided with a number of signal flags and corresponding knotters in the '661 patent, it is necessary for the operator to perceive that one of the signal flags is behaving differently than the others, all of which move through various positions during the knotting sequence as a result of corresponding movement of their slack takeup arms.

SUMMARY OF THE INVENTION

Accordingly, it is an important object of the present invention to provide a monitor which is more convenient, accurate and comprehensive than the monitor of u.S. Pat. No. 4,196,661 so as to significantly advance the art of crop baling. To this end, the present invention contemplates detecting the position of slack takeup arms for the knotters of the baler at two critical times in the bale forming sequence of steps and, if one or more of such arms is out of position at a critical time, activating a signal display in the operating cab of the tractor to alert the operator to the malfunction. The first check comes at the completion of the first knot of each double knotting cycle, i.e., when a preceding bale has been finished and two separate twine ends are brought together and tied into a knot. If all of the knots are stripped off the knotters to relieve tension in the twine strands and allow the slacker arms to rise, the checking is positive and no malfunction signal is sent to the operator. On the other hand, if even one knotter accidently wraps the twine improperly and fails to release its twine in a completed knot, the system will detect a malfunction and alert the operator accordingly.

The second check occurs shortly following completion of the second knot in each double knotting cycle, at which time the strands from two separate twine sources are brought together to span the bale chamber in preparation for receiving charges of crop materials associated with the next succeeding bale. By the time a certain number of charges of crop material have been introduced into the baling chamber and pushed rearwardly against the span of twine to deflect it into a generally U-shape "loop", the tension in the twine loops of all of the knotters should be sufficiently high to pull the slacker arms down into lowered positions. However, if any one of such twine loops fails to be properly prepared and allows its corresponding slacker arm to rise out of proper position, a malfunction will be established in the system and the operator alerted accordingly. An onboard computer comprises part of the electrical system associated with the monitor to assure accuracy and perform certain calculation and memory functions.

BRIEF DESCRIPTION OF THE DRAWINGS

FIG. 5 is a fragmentary, cross-sectional view of the knotters and monitoring system similar to FIG. 3 but showing components in a later stage of operation following formation of a bale and during the early portion of the double knotting cycle;

FIG. 6 is a fragmentary, vertical, cross-sectional view of the knotter and monitoring system showing the condition of things immediately following completion of the first knot in the double knotting cycle;

FIG. 7 is a fragmentary, cross-sectional view similar to FIG. 6, but illustrating the condition of things during a malfunction of the knotter when the first knot has failed to be tied;

FIG. 11 is an overall schematic view of the electrical system of the present invention;

FIG. 12 is an electrical schematic of the needle sensor input buffer circuit;

FIG. 13 is an electrical schematic of the top knotter sensor input buffer circuit;

FIG. 14 is an electrical schematic of the bottom knotter sensor input buffer circuit;

FIG. 15 is an electrical schematic of the stuffer cycle magnetic sensor input buffer circuit;

FIG. 16 is an electrical schematic of the timing cycle magnetic sensor input buffer circuit;

FIG. 18 is a schematic representation the visual display;

DETAILED DESCRIPTION

Mechanical Aspects

Figure 1:
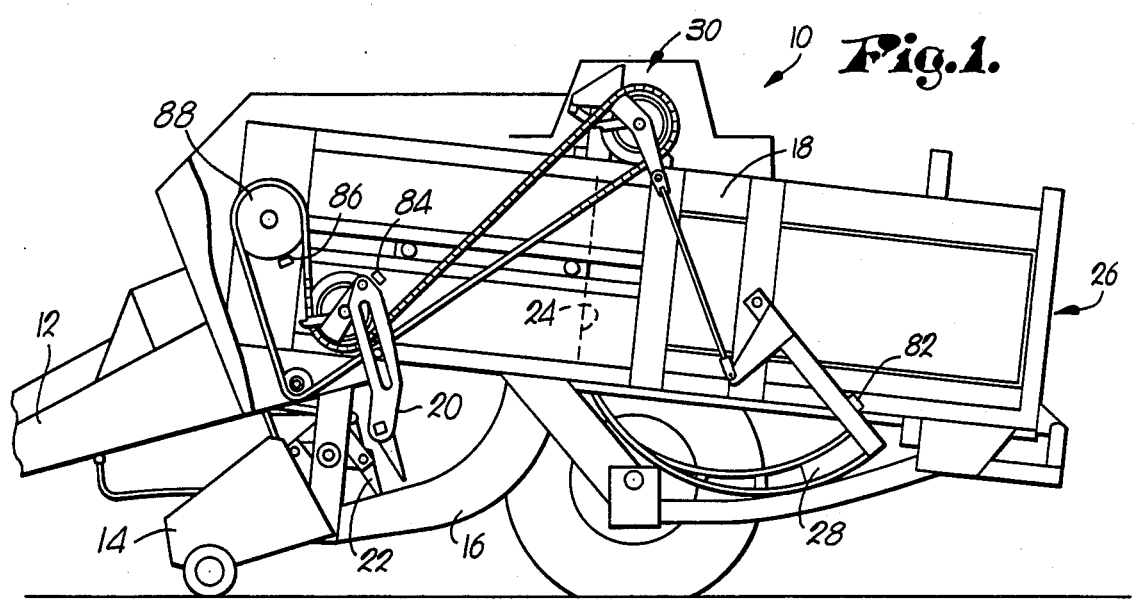
FIG. 1 is a fragmentary, side elevational view of a crop baler utilizing a knotter monitoring system in accordance with the principles of the present invention.

The baler 10 is provided with a forwardmost tongue 12 having hitch means (not shown) at its front end for coupling the baler 10 to a towing tractor. A pickup 14 lifts windrowed crop materials off the ground as the baler 10 passes thereover and delivers such materials rearwardly into the front end of a rearwardly and upwardly curved, charge-forming duct 16. The duct 16 communicates at its upper end with an overhead, fore-and-aft extending baling chamber 18 into which crop charges are loaded by a cyclically operating stuffer 20. Continuously operating packer mechanism 22 at the lower front end of the duct 16 continuously feeds and packs materials into the duct 16 so as to cause charges of the materials to take on and assume the internal configuration of the duct 16 prior to periodic engagement by the stuffer 20 and insertion up into the chamber 18. Each action of stuffer 20 introduces a "charge" or "flake" of crop material from duct 16 into chamber 18. Further details of the charge-forming and loading concepts involving the duct 16, stuffer 20 and packer 22 may be found in U.S. Pat. No. 4,106,267.

A plunger 24 reciprocates fore-and-aft within the baling chamber 18 to pack each new charge introduced into chamber 18 rearwardly toward a rearmost discharge aperture 26 (FIG. 1) of the chamber 18. The transverse dimensions of the aperature 26 may be adjustably varied by mechanism not shown so as to provide resistive back pressure for the compacting plunger 24 as the latter not only packs each new charge against previously compacted material in chamber 18 but also incrementally advances the compacted materials toward and through the discharge aperature 26.

The length of each bale produced by the baler 10 can be adjustably predetermined by means not shown, and each bale is securely bound in its final compacted form after reaching such predetermined length, before leaving the confines of the baler 10. In this respect, the baler 10 is provided with a set of periodically actuated needles 28 which are normally stationed in a standby condition below the chamber 18 but which, when actuated, swing upwardly through and across the chamber 18 to present twine to a corresponding series of knotters 30 positioned on top of the chamber 18 and extending across the width of the latter. The knotters 30 and the needles 28 preferably take the form of the corresponding knotters and needles disclosed in U.S. Pat. Nos. 4,108,062 and 4,196,661, such knotter mechanism being broadly referred to as double knotter mechanism, the structural details and operation of which may be found in said '062 and '661 patents.

Suffice it to say, therefore, that the double knotting concepts are based upon the premise that each loop of binding twine around a bale will be formed from two separate strands of twine coming from sources on top of and below the baler respectively. Each bound bale will have a stretch of twine from the upper twine source lying along the top of the bale and a second, generally U-shaped stretch of twine from the lower twine source lying along the opposite ends of the bale and along the bottom thereof. The two strands are knotted together with two separate knots at two separate locations, i.e., one at the leading end of the bale with respect to rearward discharging movement, and a second knot at the trailing end of the bale with respect to such movement. As will become clear from the following description, and as disclosed in the '062 patent in particular, each knotter 30 thus operates through two successive knotting sequences during each knotting cycle to prepare the second knot of a just-finished bale and the first knot of the next-to-be-formed bale. Then the knotters 30 pause until the next bale is completely formed, whereupon they are again actuated to move through two successive knot-forming sequences.

Figure 3:
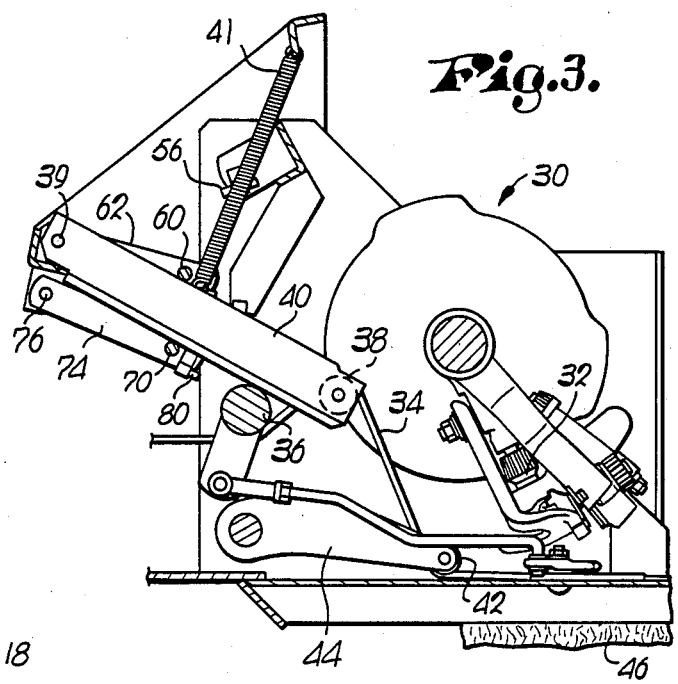
FIG. 3 is an enlarged, fragmentary, vertical cross-sectional view through the knotters illustrating the condition of things during mid-cycle of bale formation.

With reference to FIG. 3, each knotter 30 includes in relevant part a bill hook 32 that is rotated twice about a generally upright, slightly forwardly inclined axis during each knotting cycle. The top strand 34 of twine is supplied from a source to the left of the knotter 30 (viewing FIG. 3) and passes beneath a guide 36, over an idler roller 38 of a slack takeup arm 40 and under a roller 42 on a cam-operated tension control finger 44 before arriving in the vicinity of the bill hook 32. Each slacker takeup arm 40 is swingably mounted on a transverse pivot 39 and is yieldably biased upwardly by a tension spring 41. The condition of things as illustrated in FIG. 3 corresponds to that point in the bailing cycle wherein the bale 46 is approaching completion and the knotters 30 are soon to be actuated. The strand 34 extends along the top of the bale 46 to a knot (not shown) at the leading end of the bale 46 with respect to the direction of discharge.

FIG. 5 illustrates the condition of things when the bale 46 has been fully formed and the next knotting cycle has commenced. At this time the needles 28 have swung into operation with their tips passed partly up through the chamber 18, approaching their respective knotters 30. Each needle 28 carries with it at this time a strand 48 of twine from the second or lower twine source. As the needles 28 swing upwardly, the tension control fingers 44 are cammed upwardly to a slight extent by means not shown to provide clearance for the needles 28 as they deliver the top strand 34 and the bottom strand 48 to the bill hook 32. Such upward movement of the fingers 44 at this time also results in slight upward movement of the slacker takeup arms 40.

By this time the condition of things illustrated in FIG. 6 is reached, each needle 28 will have presented both strands 34,48 to the bill hook 32, the bill hook 32 will have been rotated through one revolution to form a knot, and the formed knot will have been stripped from the bill hook 32 to lie at the left end of the finished bale 46. Such a knot 50 is illustrated on the bale 46 in FIG. 6 and comprises the first knot of the knotting cycle. It is to be noted from FIG. 6 that if the first knot 50 is successfully prepared by a knotter 30 and stripped off the bill hook 32, the upper strand 34 will experience an additional measure of slack, which enables the corresponding slacker takeup arm 40 to be swung upwardly by its tension spring 41 to a raised position relative to that illustrated in FIG. 5.

Although the knot 50 has been formed and stripped from the bill hook 32, the ends of each pair of twine strands 34,48 have been retained by their respective knotters 30 and severed from the knot 50. Thus, as each needle 28 retracts downwardly away from its knotter 30, the lower strand 48 is drawn across the chamber 18 through an interface that will be defined between the trailing end of the bale 46 and the leading end of the next bale to be formed. The upper strand 34 stays at the top of the bale chamber 18.

Figure 8:
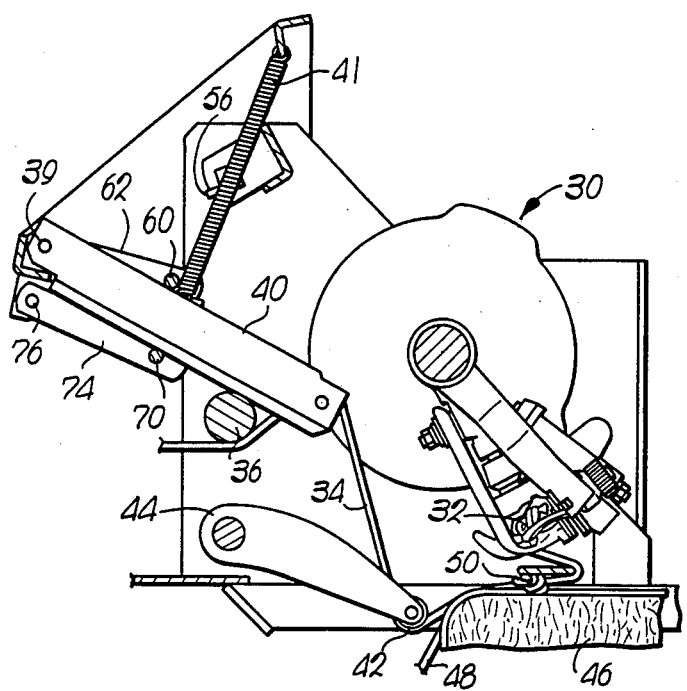
FIG. 8 is a fragmentary, vertical, cross-sectional view of the knotter and monitoring system at a later point in the double knotting cycle during formation of the second knot in preparation for commencement of the next bale formation.

FIG. 8 illustrates the condition of things while the second knot is being formed by each knotter 30. It will be noted in this respect that the plunger 24 has not yet packed the next charge of materials rearwardly against the previously formed bale 46, although by this time the needles 28 will be almost fully withdrawn from the chamber 18 in order to provide clearance for the oncoming plunger 24. It will also be noted that while the second knot is being formed, the previously provided measure of slack in upper twine stretch 34 is used up by the knot-forming rotation of the bill hook 32 and the lowering movement of tension control finger 44. Accordingly, the slacker takeup arms 40 swing down to their FIG. 8 positions.

Figure 9:
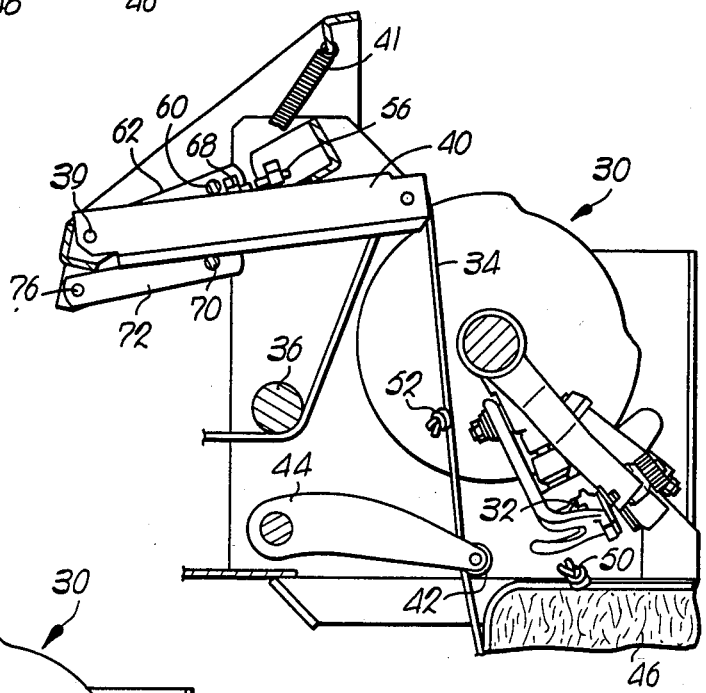
FIG. 9 is a fragmentary, vertical, cross-sectional view showing the condition of things at completion of the second knot.

By the time the condition of things illustrated in FIG. 9 is reached, the second knot 52 will have been completed and most likely stripped from the bill hook 32, although it is possible that there may be insufficient tension in the tied together strands 34 and 48 to actually pull the knot 52 off the bill hook 32 at this time. Whether or not the knot 52 actually slips off the bill hook 32 at this time is irrelevant, provided that it ultimately is pulled free by the time several charges of hay have been introduced into the bale chamber in connection with the next bale as will subsequently be made clear. Likewise, it is of no particular consequence whether or not the slack takeup arms 40 swing upwardly at this time to their FIG. 9 positions due to the increased measure of slack occasioned by the knots 52 coming off their bill hooks 32 or stay in lowered positions due to the retention of knots 52 on their bill hooks 32. In any event, this completes the double knotting cycle, and all of the knotters 30 now pause as the next bale 54 is progressively formed in chamber 18 and advanced incrementally rearwardly (illustrated generally in FIG. 10), drawing along with it additional lengths of the tied together strands 34 and 48 from their respective upper and lower twine sources.

Figure 2:
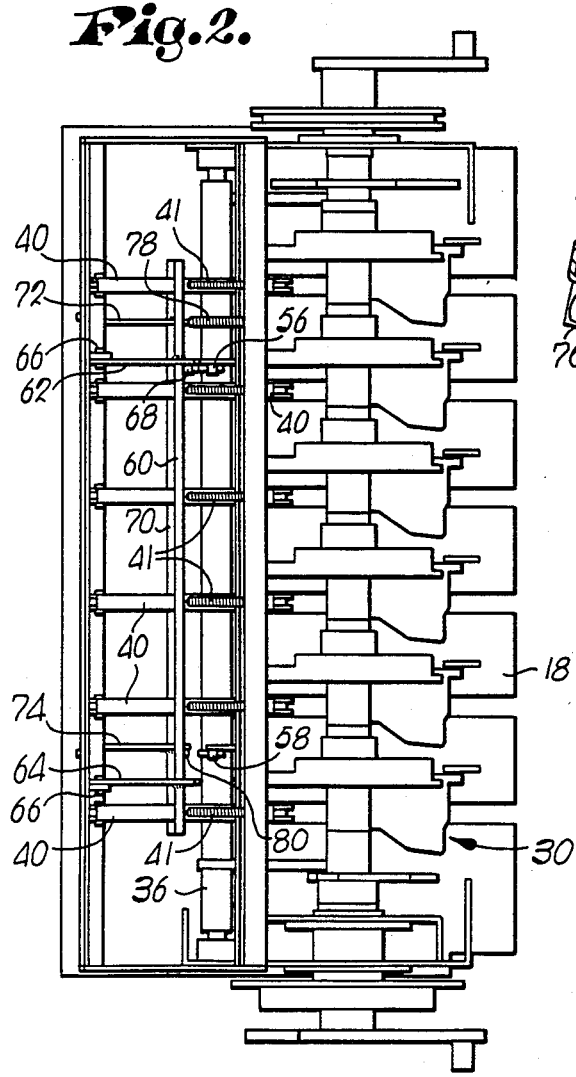
FIG. 2 is an enlarged top plan view of the knotters associated with the baler and adjacent components of the monitoring system.
Figure 4:
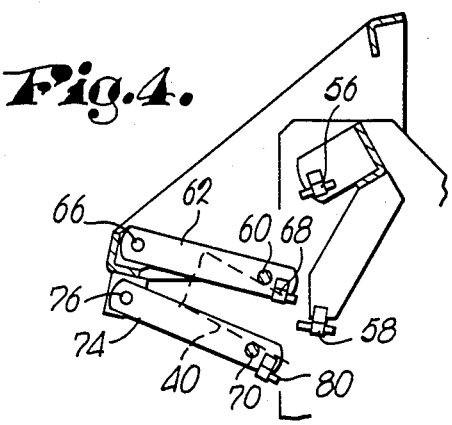
FIG. 4 is a fragmentary, schematic cross-sectional view of the mechanism illustrated in FIG. 3, but with twine slacker arm and other adjacent mechanism removed to reveal details of contruction of components associated with the monitoring system.

In accordance with the present invention a knotting monitor system is provided to detect knotter malfunctions at critical points in the knotting (or binding) cycle, i.e., immediately following formation of the first knot 50 and at a predetermined point in formation of the next bale 54 following completion of the second knot 52. In this regard, as best understood by referring initially to FIG. 4, the preferred embodiment of the monitoring system includes a pair of vertically spaced sensors 56 and 58 disposed slightly forwardly of the series of knotters 30. As illustrated in FIG. 2, the top sensor 56 is located generally adjacent the right end of the series of knotters 30 (as viewed from the rear of the baler 10), while the bottom sensor 58 is located generally adjacent the left end of the knotter series. As also illustrated in FIG. 2, a transverse, upper rod 60 spans the slacker takeup arms 40 across the tops thereof and is adapted for up and down swinging movement by a pair of support arms 62 and 64 fixed to the top rod 60 generally adjacent opposite ends thereof. The support arms 62,64 are attached to mounting structure of the baler 10 via transverse pivots 66. The top rod 60 rests by gravity on the top side of the slacker take up arms 40. A permanent magnet 68 is carried by the right support arm 62 of top rod 60 in vertical registration with the sensor 56 for engaging the latter when the rod 60 is fully raised (as illustrated for example in FIGS. 9 and 10).

A second, lower rod 70 traverses the slack takeup arms 40 beneath the latter and is swingably supported for up and down movement by a pair of support arms 72 and 74 generally adjacent opposite ends of the rod 70. Each of the support arms 72,74 is attached to adjacent structural portions of the baler 10 by transverse pivots 76 (see FIG. 3 for example). A tension spring 78 (FIGS. 2 and 10) is connected between the right support arm 72 and adjacent structural portions of the baler 10 to yieldably bias the lower rod 70 up in to contacting engagement with the bottoms of the slacker takeup arms 40. A permanent magnet 80 is attached to and carried by the outer end of support arm 74 in vertical registration with sensor 58 for making contacting engagement with the latter when the rod 70 is fully raised (as illustrated for example in FIG. 6).

From the foregoing, it should be apparent that while the needles 28 are in the home position of FIG. 1 and the bale 46 is in a stage of partial formation as illustrated in FIG. 3, both of the sensors 56,58 remain unengaged by their respective actuating magnets 68,80. Such is also true as the knotting cycle commences as shown in FIG. 5.

However, immediately following formation of the first knot 50 as illustrated in FIG. 6, the slacker takeup arms 40 rise sufficiently to permit the spring 78 to pull the bottom rod 70 up to such an extent that the lower magnet 80 magnetically couples with bottom sensor 58. Such coupling between magnet 80 and sensor 58 at this particular point in the knotting cycle occurs when the knotters 30 have properly performed in their normal way, and this contacting engagement may be utilized by the monitoring system to perform a checking and control function as will be described below with respect to electrical aspects of the system.

On the other hand, if one or more of the knotters 30 should malfunction such that one or more corresponding first knots 50 are not successfully stripped from their corresponding bill hooks 32, the condition illustrated in FIG. 7 will be obtained wherein, due to increased tension and lack of slack in the affected upper strand or strands 34, one or more of the takeup arms 40 will stay down. Thus, the bottom rod 70 is likewise held down at this time and the bottom magnet 80 is retained away from the bottom sensor 58. Such lack of engagement between the bottom magnet 80 and the bottom sensor 58 can likewise be utilized by the monitoring system to indicate a malfunction.

During the formation of each second knot 52, as illustrated in FIGS. 8 and 9, each slacker takeup arm 40 is initially pulled back down and is then normally permitted to swing upwardly (upon completion of the second knot 52). The slack occurring in upper strand 34 at such time is normally enough to cause the top rod 60 to be raised up sufficiently that upper magnet 68 magnetically couples with upper sensor 56. By the time a predetermined number of charges associated with the next bale 54 have been packed rearwardly by the plunger 24, however, the just-mentioned slack in upper strands 34 should have been removed by the rearwardly advancing bale 54 such that all of the slacker takeup arms 40 are lowered back down to their original lowered position of FIG. 3. Thus, the upper magnet 68 and the upper sensor 56 should be out of engagement with one another by this time.

Figure 10:
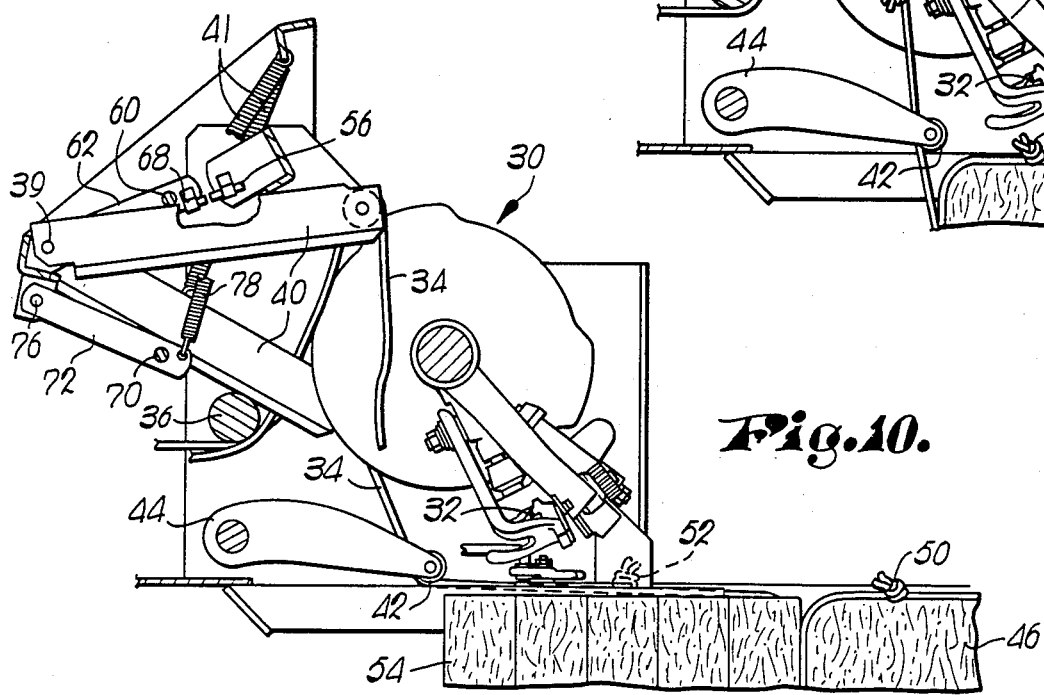
FIG. 10 is a fragmentary, vertical, cross-sectional view of the knotter and monitoring system showing the condition of things following a mistie of the second knot and the next succeeding bale partially formed.

However, if one or more of the tied together strands 34 and 48 should break by this time, the corresponding slack takeup arm or arms 40 associated with the broken twine will spring upwardly as illustrated in FIG. 10, causing the upper magnet 68 and upper sensor 56 to remain in engagement. Such continuing engagement at this critical time in the bale formation can be utilized to indicate knotter malfunction as explained more particularly below in connection with electrical aspects of the invention.

Electrical System

FIG. 11 is a schematic overview of the preferred electrical system 1100 of the knotter monitor in accordance with the present invention. The electrical system includes top and bottom sensors 56, 58 previously described plus needle sensor 82, stuffer sensor 84, and timing cycle sensor 86, computer 1102, visual display 1104, and audible alarm 1106.

In general, computer 1102 receives signal data indicative of the status of the various mechanical components of the baler from sensors 56, 58 and 82-86. Computer 1102 then analyzes the input data according to its operating program to determine whether a malfunction has occured with respect to the bale binding (or knotter) mechanism. If a malfunction has occured, computer 1102 activates visual display 1104, preferably located in the tractor cab, with the notation CK NTR, which means check the knotter mechanism for a malfunction or failure. Computer 1102 also briefly sounds audible alarm 1106 to alert the operator that a malfunction or failure has occured.

Broadly speaking, the knotter monitor hereof monitors for two types of failures. First, computer 1102 receives data indicative of needle position from sensor 82 to determine the beginning of the binding (or knotting) cycle and receives cycle data from the timing cycle magnetic sensor 86 from which computer 1102 determines the end of the binding cycle. Computer 1102 then determines, based on input from bottom knotter sensor 58, whether the slacker arms 40 have moved up and then down as normally expected. If these normal movements of slacker arms 40 do not occur during the binding cycle, then a failure of the mechanism is indicated which typically occurs if twine becomes wrapped around the bill hook of the knotter. If such a failure occurs, computer 1102 activates visual display 1104 and audible alarm 1106.

The knotter monitor also checks for a malfunction involving twine failure, for example, in which the binding twine strand breaks, the knotter fails to tie a knot or the knot slips, or the binding mechanism runs out of twine. Normally, after knotters 30 have tied a knot, sufficient slack exists in the twine strands so that the associated slacker arms 40 move upwardly a sufficient distance to activate top knotter sensor 56. Subsequently, however, the beginning portion of the next bale being formed normally takes up the slack in the twine strands 34 so that the slacker arms 40 move downwardly and deactivate top knotter sensor 56. Sensor 56 is normally deactivated by the time stuffer sensor 84 has gone through five cycles after the end of the binding cycle during which five charges or flakes have been introduced into baler 10.

Computer 1102 monitors for these twine failures as discussed above by determining whether top knotter sensor 56 is still active after five stuffer cycles have occured after the end of the binding cycle. If sensor 56 is still active, computer 1102 activates visual display 1104 and audible alarm 1106.

Computer 1102 includes input buffer circuits 1200, 1300, 1400, 1500, and 1600, and microprocessor circuit 1700. The design of computer 1102 incorporates a microprocessor which is described further hereinafter and as such, computer 1102 may be alternately described as a microcomputer. Those skilled in the art will recognize that various means are available for performing the needed electronic functions in accordance with the present invention. For example, hardware could be configured to perform all of the needed functions thereby excluding the need for software. Computer 1102 is preferred, however, for versatility in performing other functions not the subject of the present invention and for economy of manufacture. Additionally, a conventional power supply (not shown) is provided for supplying stable +5 v.d.c. power to computer 1102. Advantageously, the power supply receives its input power from the electrical system of the tractor pulling baler 10, typically at 12 volts d.c.

Turning now to the details of the input buffers, FIG. 12 illustrates the needle sensor input buffer circuit 1200. Needle sensor 82 is a conventional, normally open, reed switch (as are sensors 56, 58) which is activated to the closed position when the needles 28 are in the home position. Sensor 82 is preferably mounted to the frame of the baler 10 (FIG. 12) and an actuating magnet (not shown) is mounted to the shiftable mechanism of needles 28.

One side of needle sensor 82 is connected to ground as shown in FIG. 12, the other side is connected via line 1201 to one side of transient suppression filter 1202 (available from Mu Rata Company, Part #DS710-D-2235-12-72), to one side of pull up resistor 1204 (1000 ohms), and to one side of current limiting resistor 1206 (100K ohms). The other side of filter 1202 is connected to ground as shown. The other side of resistor 1204 is connected to +5 v.d.c. The other side of resistor 1206 is connected via line 1207 to output terminal 1208 which supplies signal NEDL indicative of the beginning of the binding cycle when needles 28 leave the home position.

In the home position, needle sensor 82 connects circuit 1200 to ground which pulls the output on terminal 1208 low. When the needles leave the home position, needle sensor 82 opens and the output at terminal 1208 is pulled high to +5 v.d.c., through resistors 1204 and 1206.

FIG. 13 is identical to FIG. 12 with the resistors having the same corresponding values, and illustrates top knotter sensor input buffer circuit 1300. One side of top knotter sensor 56 is connected to ground as shown and the other side is connected via line 1301 to one side of transient suppression filter 1302, to one side of pullup resistor 1304, and to one side of current limiting resistor 1306. The other side of filter of 1302 is connected to ground as shown, the other side of resistor 1304 is connected to +5 v.d.c., and the other side of resistor 1306 is connected via line 1307 to output terminal 1308.

Normally, top knotter sensor 56 is open and the output at terminal 1308 is pulled high to +5 v.d.c. via resistors 1304 and 1306. If one of the slacker arms 40 moves up to an excessive slack position, top knotter sensor 56 closes which pulls terminal 1308 low. Circuit 1300 provides the output signal NTRT at terminal 1308 which is indicative of slacker arm position.

FIG. 14 illustrates bottom knotter sensor input buffer circuit 1400 which is identical to circuits 1200 and 1300 including the same corresponding value for the resistors. One side of bottom knotter sensor 58 is connected to ground as shown and the other side is connected via line 1401 to one side of transient suppression filter 1402, to one side of pull-up resistor 1404, and, to one side of current limiting resistor 1406. The other side of filter 1402 is connected to ground as shown, the other side of resistor 1404 is connected to +5 v.d.c. and the other side of resistor 1406 is connected via line 1407 to output terminal 1408.

Bottom knotter sensor 58 is normally open and terminal 1408 is pulled high to +5 v.d.c. via resistors 1404 and 1406. Normally during the binding cycle, when slacker arms 40 move upwardly, bottom knotter sensor 58 closes to pull terminal 1408 low. The slacker arms then normally return to their first position which allows sensor 58 to open and terminal 1408 again goes high. Terminal 1408 provides the output signal NTRB which is indicative of slacker arm position.

FIG. 15 illustrates stuffer cycle magnetic sensor input buffer circuit 1500 which includes stuffer cycle magnetic sensor 84. Sensor 84 is a conventional inductive coil sensor such as that manufactured by Wabash Company as variable reluctance sensor No. 60-0128 activated by a metal tab (not shown) mounted to the stuffer arm 20. The sensor 84 is mounted to the baler 10 (FIG. 1) and schematically illustrated in FIG. 15. As the tab passes by sensor 84 with each revolution of stuffer arm 20, a voltage pulse is induced which is buffered and converted to digital form by circuit 1500 and which presents the output STF CYC (stuffer cycle) indicative of each cycle of the stuffer arm during which the stuffer arm introduces a charge or flake of crop material into the baler.

One side of sensor 84 is connected to ground as shown and the other side is connected via line 1501 to transient suppression filter 1502 and to current limiting resistor 1504 (2.2K ohms). The other side of filter 1502 is connected to ground as shown. The other side of resistor 1504 is connected via line 1505 to the anode of clamping diode 1506, to the cathode of clamping diode 1508, and to one side of coupling capacitor 1509 (4.7 u.f.). The other side of capacitor 1509 is connected via lines 1511 to one side of pull-up resistor 1510 (100K ohms), and to the negative input terminal of voltage comparator 1512 (National Semiconductor Type LM2903). The other side of resistor 1510 is connected to reference voltage VR1 (+2.5 v.d.c.). The positive input terminal of comparator 1512 is connected via line 1513 to one side of resistor 1514 (2.2M ohms) and to one side of pull-up resistor 1516 (33K ohms). The other side of resistor 1516 is connected to reference voltage VR2 (+2.73 v.d.c.). Reference voltages VR1 and VR2 are also supplied by the conventional power supply at the reference voltages specified according to power supply techniques well known to those skilled in the art.

The other side of resistor 1514 is connected via line 1517 to pull-up resistor 1518 (10K ohms), to the output of comparator 1512, and to the cathode of clamping diode 1520. The other side of resistor 1518 is connected to +5 v.d.c. The anode of diode 1520 is connected via line 1521 to pull-up resistor 1522 (100K ohms) and to output terminal 1524. The other side of resistor 1522 is connected to +5 v.d.c.

When sensor 84 is activated by the sweep of the magnet connected to stuffer arm 20, it produces a rising voltage peaking at about 1.5 v.d.c. which is transmitted via resistor 1504 and capacitor 1509 to the negative input terminal of comparator 1512. In the quiescent state, the voltage at the negative input terminal of comparator 1512 is at +2.5 v.d.c. due to the reference voltage VR1 supplied by way of resistor 1510. The diode of 1506 limits the voltage rise from sensor D to about 0.7 v.d.c. at the negative input terminal of comparator 1512 whereby this voltage rises from the reference level of 2.5 v.d.c. to 3.2 v.d.c. When voltage at the negative terminal of comparator 1512 is at 3.2 v.d.c., it exceeds the reference voltage of 2.73 v.d.c. on the positive input terminal of comparator 1512 which is supplied from VR2 via resistor 1516. When this occurs, the output of comparator 1512 goes low which pulls output terminal 1524 low as an indication that a stuffing cycle is in progress. When the tab passes beyond sensor 84, the voltage at terminal 1524 is again pulled high to +5 v.d.c. which is the normal quiescent state. Thus, circuit 1500 translates the pulse generated by sensor 84 into an inverted square wave pulse at output terminal 1524. The output signal STF CYC at terminal 1524 is used by computer 1102 to count stuffer cycles as an indication of the formation of the beginning portion of the next bale.

FIG. 16 illustrates timing cycle magnetic sensor input buffer circuit 1600 which is identical to circuit 1500 including the same values and model numbers for the corresponding components. The teeth of rotating timing sprocket 88 (FIG. 1) of baler 10 to which needles 28 are mechanically linked successively activate sensor 86. Sensor 86 itself is affixed to the baler in order to be activated during revolution of sprocket 88.

One side of sensor 86 is connected to ground as shown and the other side is connected via line 1601 to transient suppression filter 1602 and to current limiting resistor 1604. The other side of filter 1602 is connected to ground as shown. The other side of resistor 1604 is connected via line 1605 to the anode of clamping diode 1606, to the cathode of clamping diode 1608, and to one side of coupling capacitor 1610. The other side of capacitor 1610 is connected via line 1611 to one side of pull up resistor 1612 and to the negative input terminal of voltage comparator 1614. The other side of resistor 1612 is connected to reference voltage VR1 (+2.5 v.d.c.). The positive input terminal of comparator 1614 is connected via line 1615 to pull-up resistor 1616 and to resistor 1618. The other side of resistor 1616 is connected to reference voltage VR2 (+2.73 v.d.c). The other side of resistor 1618 is connected via line 1619 to one side of pull up resistor 1620, the output of comparator 1614, and the cathode of diode 1622. The other side of resistor 1620 is connected to +5 v.d.c. The anode of diode 1622 is connected via line 1623 to resistor 1624 and output terminal 1626. The other side of resistor 1624 is connected to +5 v.d.c.

The operation of circuit 1600 is the same as that of circuit 1500 in that the output at terminal 1626 is pulled high to +5 v.d.c. in the quiescent state. When an individual tooth on sprocket 88 sweeps by sensor 86, the output at terminal 1626 goes low and then high again when the tooth passes beyond sensor 86. Thus, the output at terminal 1626 is indicative of the timing cycle which is in turn indicative of the position of the binding mechanism needles.

Figure 17:
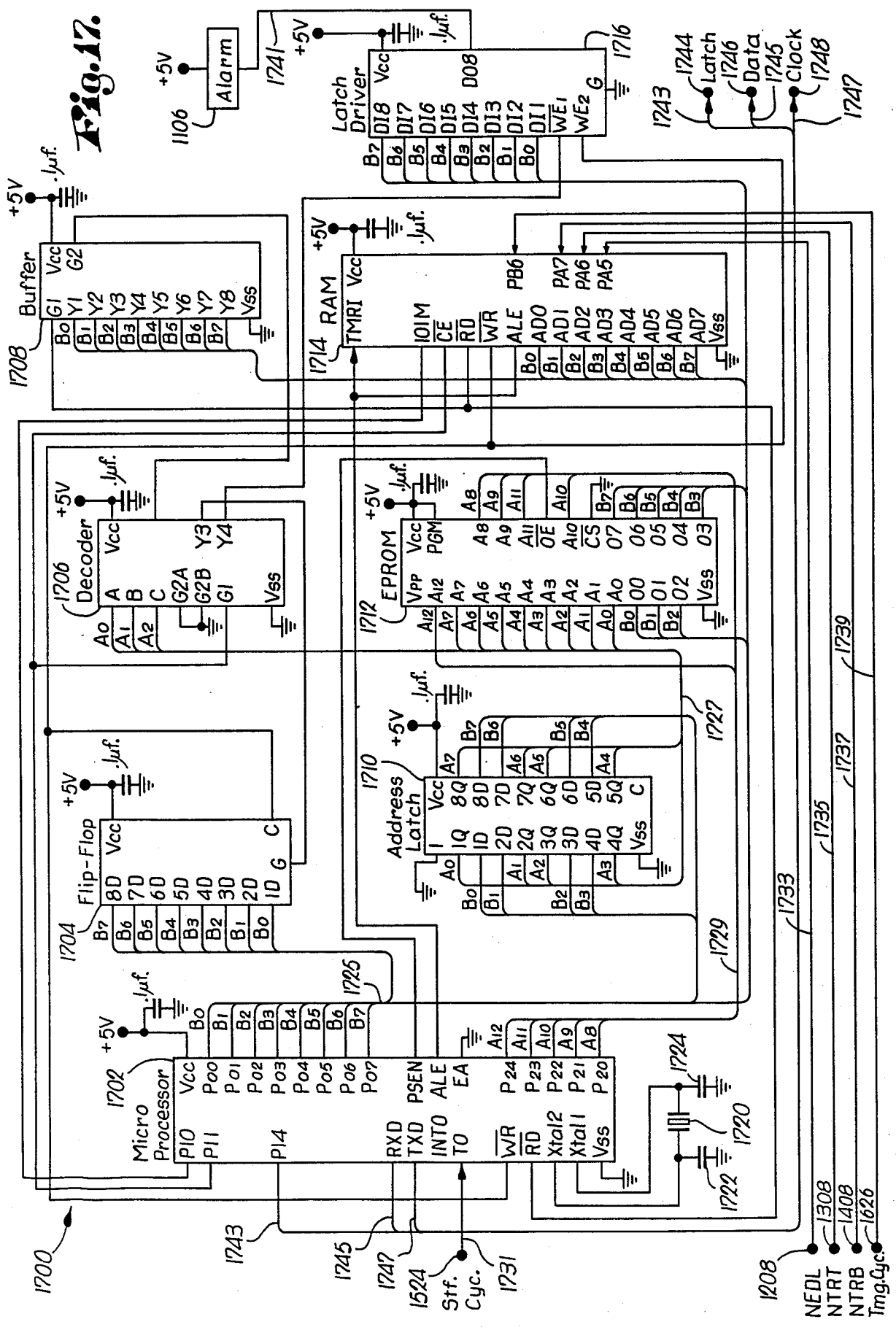
FIG. 17 is electrical schematic of the microprocessor circuit including the audible alarm circuit.

Microprocessor circuit 1700 includes microprocessor 1702 (Type 80C31), octal "D" flip-flop 1704 (Type 74HCT377), three-two-eight line decoder 1706 (Type 74HCT138), octal buffer and line driver 1708 (Type 74HC541), address latch 1710 (Type 74HCT373), electrically programmable read-only-memory (EPROM) 1712 (Type 27C64), auxilliary random access memory (RAM) 1714 (Type 81C55) with input-output ports, and latch driver 1716 (Type DP8310). FIG. 17 also illustrates conventional audible alarm 1106 which is operable to produce an audible tone.

Microprocessor 1702 includes an external crystal 1720 and capacitors 1722, 1724 connected at shown in FIG. 17 to generate a 12 megahertz time base for microprocessor 1702.

Components 1702-1724 are conventionally interconnected as shown in FIG. 17.

Data bus 1725 includes lines B0 (least significant bit), B1, B2, B3, B4, B5, B6, and B7 and interconnects microprocessor 1702, flip-flop 1704, buffer 1708, address latch 1710, EPROM 1712, RAM 1714, and latch driven 1716 as shown. Low address bus 1727 includes lines A0 (least significant bit), A1, A2, A3, A4, A5, A6, and A7 and interconnects address latch 1710, EPROM 1712, NS decoder 1706. Additionally, high address bus 1729 includes lines A8, A9, A10, A11, and A12 (most significant bit) and interconnects microprocessor 1702, abd EPROM 1712. Other lines of the circuit are shown individually or bundled as needed for drawing clarity.

Microprocessor circuit 1700 receives five inputs from the input buffers as described above. Microprocessor 1700 receives the signal STF CYC at terminal TO via line 1731 from teminal 1524. RAM 1714 receives the other four input signals. RAM terminal PA5 receives the signal NEDL from terminal 1208 via line 1733. RAM terminal PA6 receives signal NTRT from terminal 1308 via line 1735. RAM terminal PA7 receives signal NTRB from terminal 1408 via line 1737. RAM terminal PB6 receives the signal TMG CYC from terminal 1626 via line 1739.

Microprocessor circuit 1700 produces four outputs. The first output is at terminal DO8 of latch driver 1716 which connects to audible alarm 1718 via line 1741.

Microprocessor 1700 produces the other three outputs which are used to drive visual display 1104. The first output is the serial latch signal from microprocessor terminal P14 via line 1743 to serial latch output terminal 1744. Serial data is transmitted from terminal RXD of microprocessor 1702 via serial data bus or line 1745 to serial data output terminal 1746. Serial clock data is transmitted from microprocessor terminal TXD via serial clock bus or line 1747 to serial clock output terminal 1748.

Microprocessor circuit components 1702-1718 are connected as shown in FIG. 17 to receive +5 v.d.c. power supply input and are A.C. bypassed to ground with 1 uf. capacitors as shown.

FIG. 18 schematically illustrates the electrical assembly 1800 for visual display 1104. Assembly 1800 includes conventional display circuit 1802 which includes a conventional display driver such as National Semiconductor Model MM5483, and conventional liquid crystal display with segments as appropriate for the desired visual notation such as the preferred CK NTR notation. Display circuit 1802 receives inputs for serial latch, data, and clock from terminals 1744, 1746, and 1748 respectively via lines 1805, 1807, and 1809 respectively. Display circuit 1802 provides the appropriate conventional output to activate the segments of LCD display 1804.

Figure 19A:
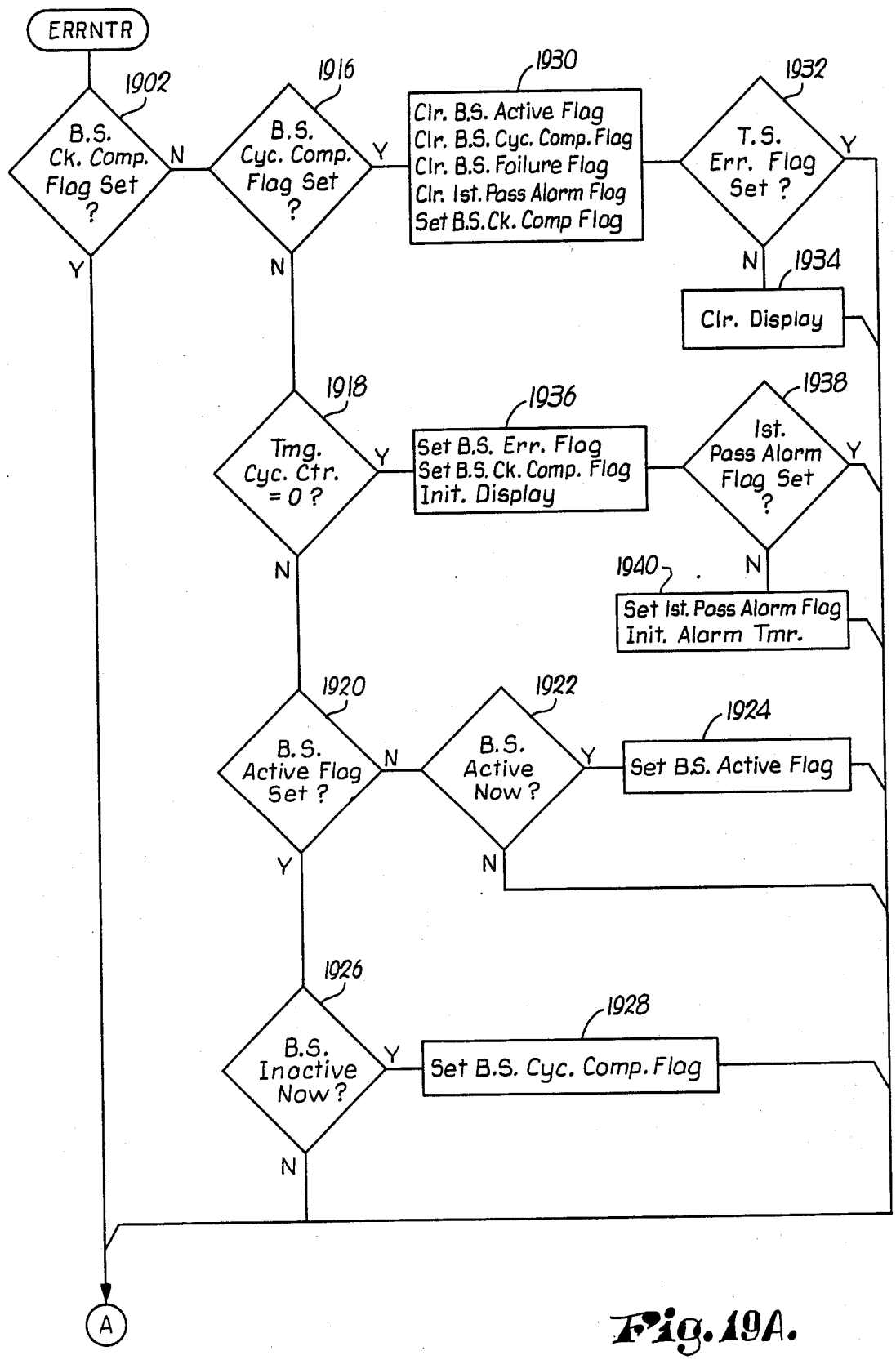
FIG. 19A is the first part of the computer program flowchart for the knotter error module.
Figure 19B:
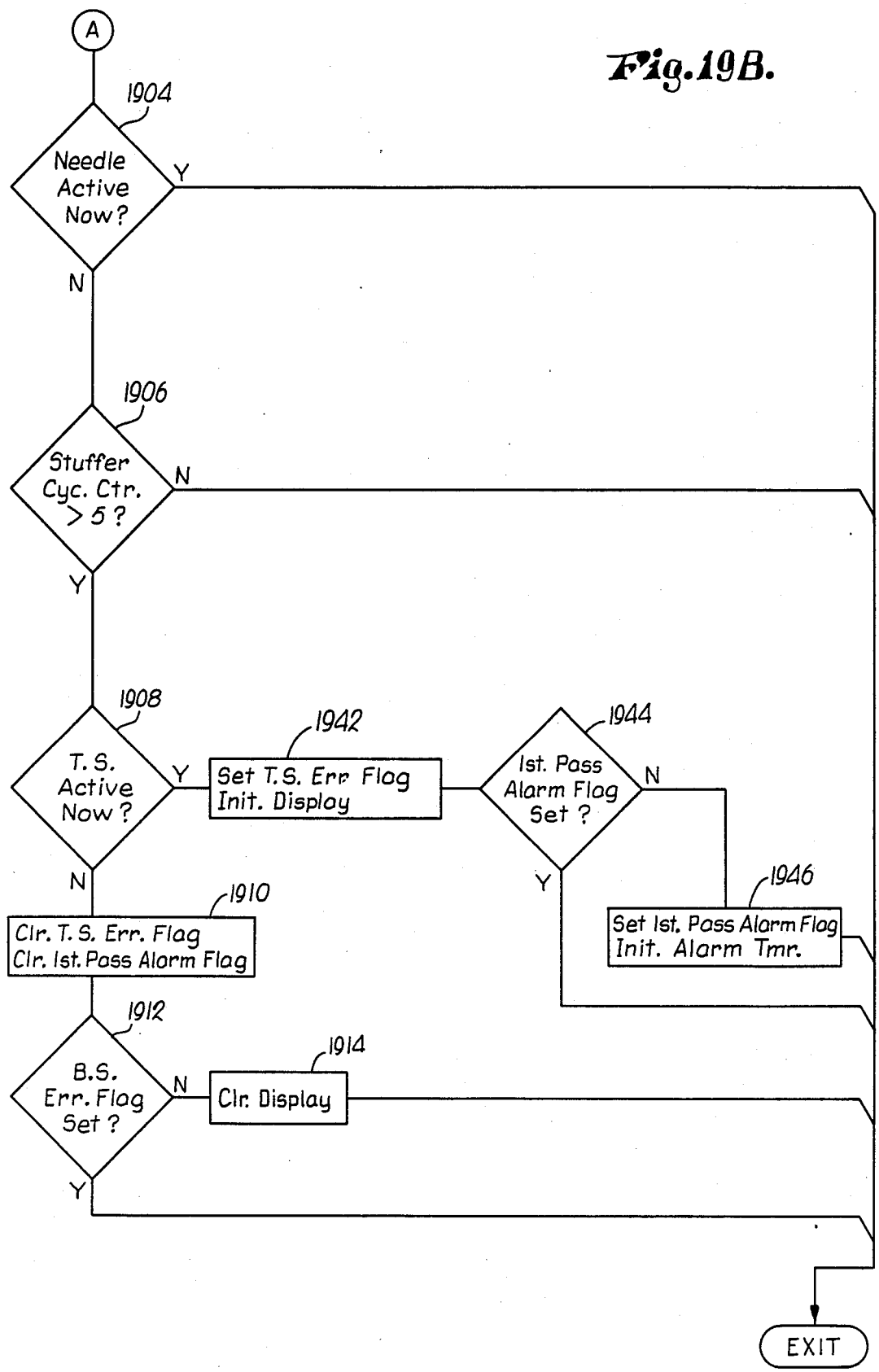
FIG. 19B is the second part of the computer program flowchart for the knotter error submodule.
Figure 20:
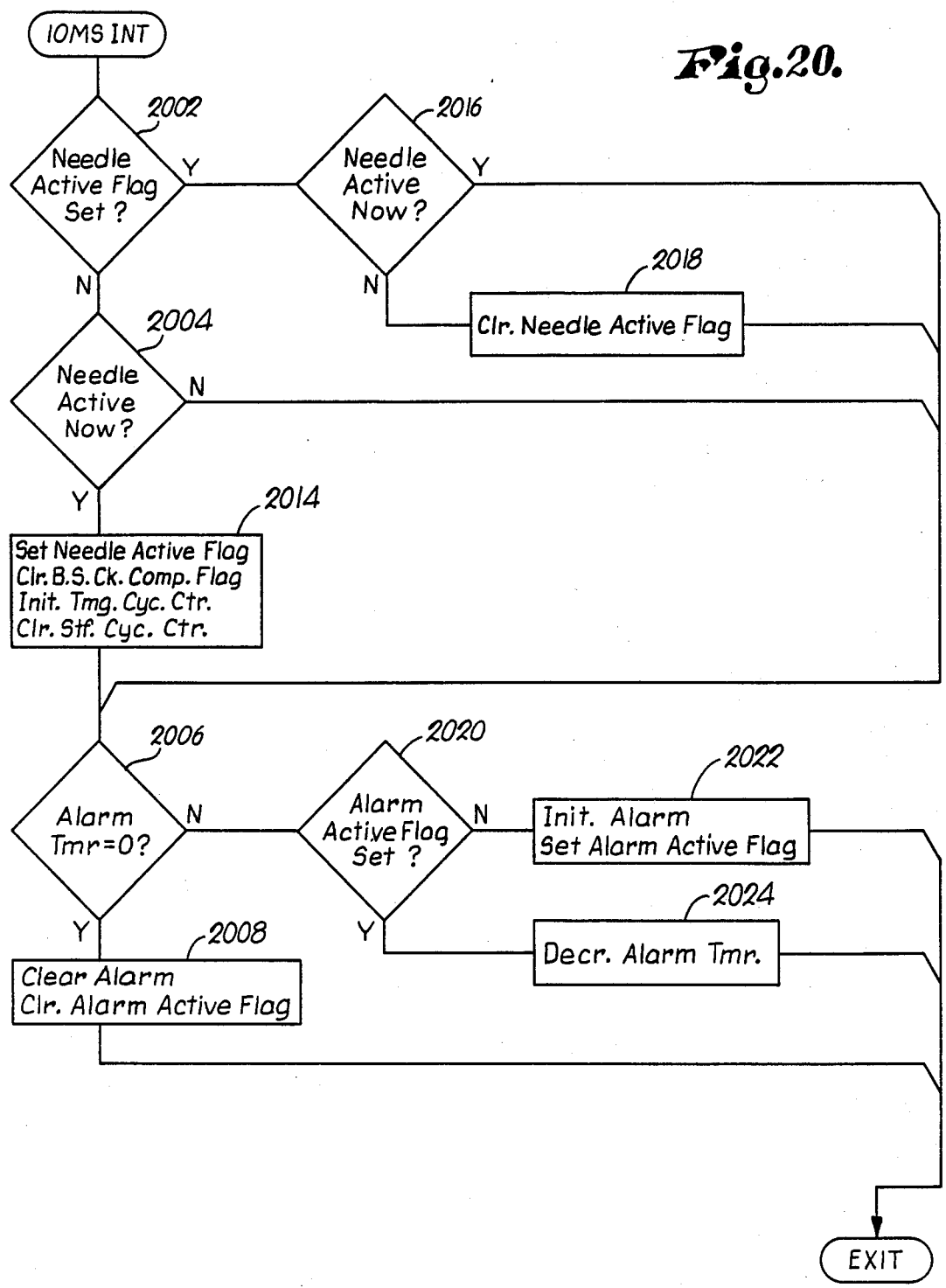
FIG. 20 is a computer program flowchart for the 10 millisecond interrupt module.
Figure 21:
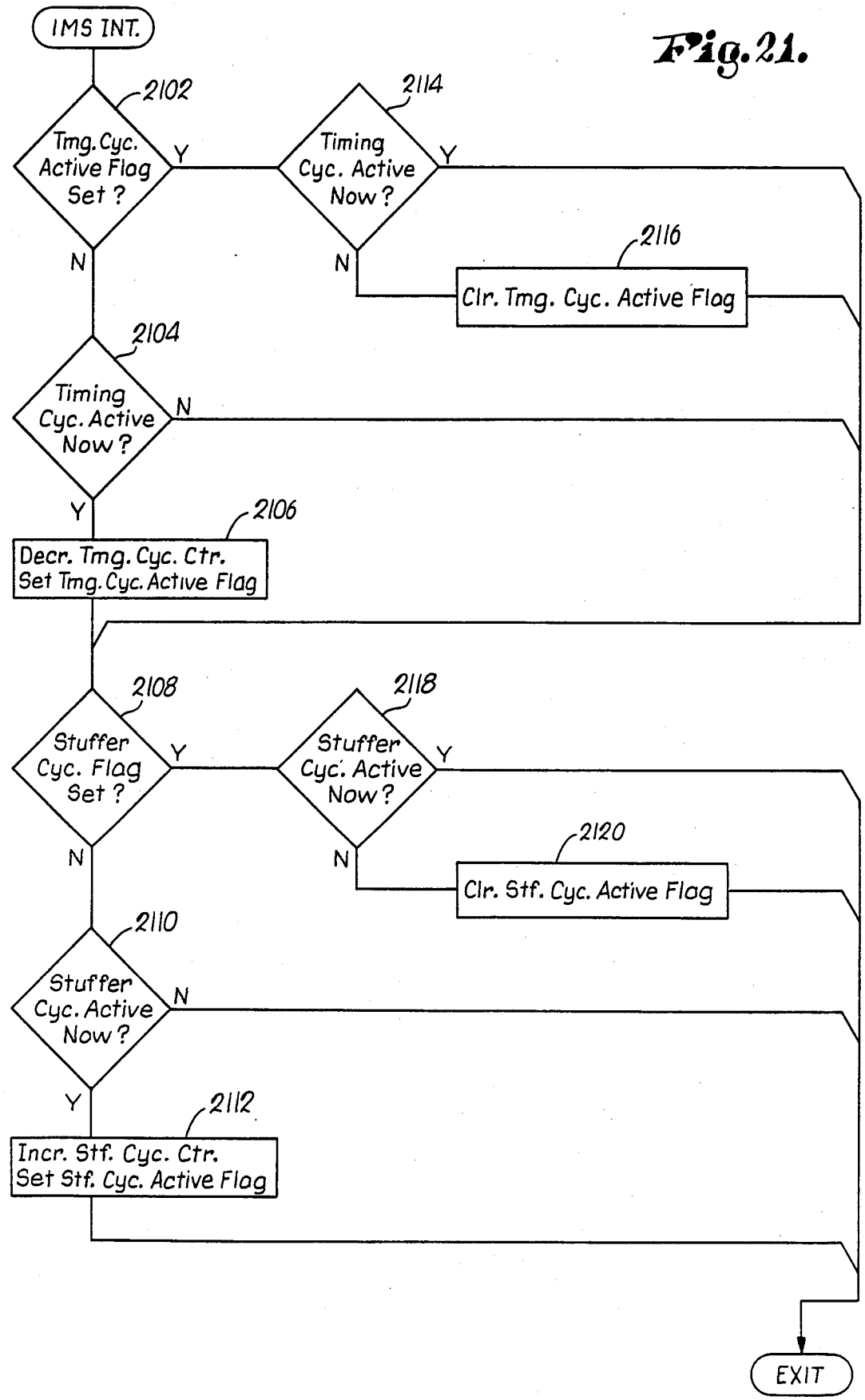
FIG. 21 is a computer program flowchart for the 1 millisecond interrupt module.

FIGS. 19a, b, 20, and 21 are flowcharts illustrating the pertinent module of the operating program for computer 1102. Those skilled in the art will recognize that the modules can easily be incorporated as part of a larger scheme for performing functions not the subject of the present invention according to known conventional programming techniques. FIGS. 19-21 illustrate three modules knotter error (ERRNTR), 10 millisecond interrupt (10 MS INT), and 1 millisecond interrupt (1 MS INT).

FIGS. 19a, b illustrate the knotter error module (ERRNTR). In general, FIG. 19a is the flowchart to determine whether bottom knotter sensor goes active and then inactive during binding cycle. FIG. 19b generally illustrates the flowchart to determine whether the top knotter sensor remains active after five stuffer cycles.

Turning now to the details of module ERRNTR, the explanation herein assumes initially that the binding mechanism is not in the active phase of the binding cycle which means that needles 28 are in the home position, knotters 30 are inactive, and baler 10 is in the process of forming a bale. The operating program enters at step 1902 which asks whether the bottom knotter sensor (B.S.) check complete flag is set. Normally the bottom sensor check complete flag was set at the completion of the previous bottom sensor check cycle. Since the baler is not in the active phase of the binding cycle, there is no need to monitor the operation of the bottom sensor and so the program moves on to step 1904.

Step 1904 asks whether needles 28 are active now as indicated by the state of needle sensor 82. Needles 28 are assumed in the home position and so needle sensor 82 is closed, terminal 1208 is low, and RAM terminal PA5 (FIG. 17) receives signal NEDL indicating that the needle is in the home position and is not now active. The program next moves to step 1906 which asks whether the stuffer cycle counter has incremented to a count greater than five. This software counter was initiated at zero at the end of the previous binding cycle and increments by one count each time stuffer cycle sensor 84 pulses in response to a complete cycle of stuffer arm 20 which corresponds to one charge or flake of crop material introduced into baler 10. With each cycle of stuffer arm 20, terminal 1524 (FIG. 15) goes momentarily low which is transmitted to terminal TO of microprocessor 1700 (FIG. 17) (signal STF CYC). Each down pulse received at terminal TO increments the stuffer cycle counter by one.

As explained above, top knotter sensor 56 may be active until the beginning portion of the next bale is formed whereby the bale takes up any excess slack in the twine strands which in turn pulls down slacker arms 40 and which deactivates the top knotter sensor 56. Thus, the program is designed to exit from step 1906 if six or more stuffer cycles have not occurred since the end of the previous binding cycle.

The program continues to pass through steps 1902-1906 and exit until the stuffer cycle counter has incremented to greater than five as indicated in step 1906. When this occurs, the program moves on to step 1908 and asks whether top knotter sensor 56 (T.S.) is active now. Normally the top sensor 56 should not be active unless one of the twine strands is broken or one of the twine supply bundles has been depleted, for example. If top sensor 56 is not active, the program moves on to step 1910 to clear the top sensor error flag and to clear the first pass alarm flag, and then moves on to step 1912.

Step 1912 asks whether the bottom sensor error flag is set which is not set unless a failure has been previously indicated. Assuming the bottom sensor error flag is not set, the program moves on to step 1914 to clear any display of the notation CK NTR on visual display 1104. The program then exits and continues to pass through steps 1902-1914 until needles 28 go active in step 1904 which marks the beginning of the binding cycle. When needles 28 move from the home position, needle sensor 82 opens and terminal 1208 (FIG. 12) goes high which is transmitted via line 1733 to terminal PA5 of RAM 1714 (FIG. 17). When the needles go active, that is, move from their home position, step 1904 is yes and the program exits module ERRNTR thus bypassing the top knotter sensor checks.

When the needles go active, the 10 millisecond interrupt module (FIG. 20) clears the bottom cycle check complete flag through process which will be explained further hereinbelow.

When the program reenters module ERRNTR at step 1902, the bottom sensor check complete flag has been cleared and the program moves to step 1916 which asks whether the bottom sensor cycle complete flag is set. Normally, this flag was cleared before the end of the previous binding cycle and the program moves to step 1918.

Step 1918 asks whether the timing cycle counter has decremented to zero. When needles 28 went active, the 10 millisecond interrupt initiated the timing cycle counter at a count of 255 and this counter is decremented with the reception of each TMG CYC signal received by RAM terminal PB6 (FIG. 17) from terminal 1626. As explained in connection with circuit 1600, each pulse of timing cycle magnetic sensor 86 causes a corresponding down pulse from high to low at terminal 1626. Since timing cycle sprocket 88 and needles 28 are mechanically interlinked, the count of 255 on the timing cycle counter is designed to correspond to the time when needles 28 have returned to the home position. When the timing cycle counter decrements to zero, this marks the end of the binding cycle.

Before the end of the binding cycle, that is before timing cycle counter decrements to zero, the bottom switch should go active and then inactive if there is no malfunction or failure. Thus, at the beginning of the binding cycle, the timing cycle counter has not yet decremented to zero and the program moves to step 1920. Step 1920 asks whether the bottom sensor active flag has been set which is not set until bottom sensor 58 goes active. Thus, the program moves on to step 1922 which asks whether the bottom sensor is active now. After knotter 30 ties a knot in the respective twine strands, and slacker arms 40 move upwardly to the upper position, bottom sensor 58 closes and terminal 1408 (FIG. 14) goes low. The NTRB signal at terminal 1408 is transmitted via line 1737 to RAM terminal PA6 (FIG. 17), which indicates in step 1922 that the bottom sensor is active. Until the bottom sensor is active, the program moves to step 1904 (FIG. 19b).

When the bottom sensor does go active, the program moves on to step 1924 which sets the bottom sensor active flag for step 1920. During the next pass through the ERRNTR module, the bottom sensor active flag is set in step 1920 and the program moves to step 1926 which asks whether bottom sensor 58 is inactive now. Until bottom sensor 58 goes inactive again, the program moves on to step 1904 with each pass therethrough. Normally, bottom sensor 58 subsequently goes inactive when slacker arms 40 return to the lower position, at which point the program moves to step 1928 which sets the bottom sensor cycle complete flag. During the next pass through the module, the program sees the bottom sensor cycle complete flag set in step 1916 and then moves to step 1930 which clears the bottom sensor active flag, the bottom sensor cycle complete flag, the bottom sensor failure flag, the first pass alarm flag, and sets the bottom sensor check complete flag for step 1902.

The program then moves to step 1932 which asks whether the top sensor error flag is set. Unless there has been a failure with regard to the top sensor, this flag is not set and the program moves to step 1934 to clear any display of the notation CK NTR. The program then moves on to step 1904. If the top sensor error flag is set in step 1932 the program does not clear the display but rather moves directly to step 1904.

During the next pass through the ERRNTR module, the program sees that the bottom sensor check complete set in step 1902 and moves directly to step 1904.

As noted above with regard to steps 1920, 1926, 1928, the bottom sensor cycle complete flag in step 1928 is set only if the bottom sensor is seen active in step 1920 and then seen inactive in step 1926, both of which must occur before the timing cycle counter decrements to zero in step 1918. If an abnormality occurs in which the bottom sensor cycle complete flag is not set before the timing cycle counter decrements to zero, the program moves from step 1918 to step 1936 to set the bottom sensor error flag, the bottom sensor check complete flag, and to initiate the display. The bottom sensor error flag is set to prevent the top sensor part (FIG. 19b) of the ERRNTR module from clearing the display. The bottom sensor check complete flag is set so that the program moves directly from step 1902 to step 1904 to prevent reactivating the display.

The program then moves to step 1938 which asks whether the first pass alarm flag has been set which, at this point, has not been set, and the program moves to step 1940 to set the first pass alarm flag and to initiate the alarm timer in order to sound audible alarm 1106. (The operation of the alarm timer will be described in further detail in connection with the 10 millisecond interrupt module of FIG. 20.) Once initiated, the audible alarm sounds for 4 seconds which alerts the baler operator to look at display 1104 which visually indicates the notation CK NTR.

The knotter monitor hereof is also designed to initiate the audible alarm and the display in the event of an abnormality, a malfunction, or failure associated with the top sensor. If the stuffer cycle counter has incremented to a number greater than five in step 1906, and top sensor 56 is active, the program moves from step 1908 (FIG. 19b) to step 1942 to set the top sensor error flag which is noted in step 1932, and to initiate the display.

The program then moves to step 1944 which asks whether the first pass alarm flag is set. If a bottom sensor associated error set the alarm flag in step 1940, and initiated the audible alarm, there is no need to again reinitiate the alarm and display. Thus, if the first pass alarm flag has been set in step 1940, the program exits from step 1944.

If the first pass alarm flag has not been set, however, the program moves to step 1946 to set the first pass alarm flag and to initiate the alarm timer in order to sound audible alarm 1718 for 4 seconds. The program then exits the ERRNTR module.

The 10 millisecond interrupt (10 MS INT) module is illustrated in FIG. 20. This module interrupts other modules every 10 milliseconds and enters step 2002 which asks whether the needle active flag is set. Assuming that the binding cycle has not yet begun, the needle active flag is not set and the program moves to step 2004. Since needles 28 have not yet gone active (that is, moved from the home position), the program moves to step 2006 which asks whether the alarm timer has decremented to zero. Unless the audible alarm is actually sounding, this timer does equal zero and the program moves to step 2008 to clear the alarm and clear the alarm active flag and then exits.

If, on the next program pass, needles 28 have begun to move from their home position, needle sensor 82 is open, terminal 1208 is high, and the microprocessor receives this information at terminal PA5 of RAM 714.

This program then moves from step 2004 to step 2014 to set the needle active flag, to clear the bottom sensor check complete flag (see step 1902), to initiate the timing cycle counter (see step 1918), and to clear the stuffer cycle counter (see step 1906). The program then moves through steps 2006 and 2008, and exits.

During the next pass through the 10 MS INT module, the needle active flag of step 2002 is set and the program moves to to step 2016 to verify that needles 28 are still active. If not, which is indicative of a spurious event concerning needle sensor 82, the program moves to step 2018 to clear the needle active flag. If needles 28 are still active in step 2016, the program moves on to step 2006.

If during the ERRNTR module, an abnormality or failure condition is indicated, and the audible alarm is initiated (see steps 1940 and 1946), the alarm timer does not equal zero in step 2006 and the program moves to step 2020. If this is the first pass through after the alarm timer has been initiated, the alarm active flag in step 2020 is not yet set and the program moves to step 2022 to actually initiate and sound alarm 2022 and to set the alarm active flag. To initiate the audible alarm, terminal DO8 of latch driver 1716 goes low to sink current from alarm 1106 from a source supplied thereto at +5 v.d.c. as shown in FIG. 17.

On the next pass through the 10 MS INT module, the alarm active flag in step 2020 is set, and the program then moves to step 2024 to decrement the 4 second alarm timer. The program continues to decrement the alarm timer until the alarm timer has decremented to zero as indicated in step 2006 in which case the program clears the alarm, that is terminal DO8 of latch driver 1716 goes high at +5 v.d.c., and clears the alarm active flag. Thus, the alarm sounds only for one 4 second interval per alarm condition.

When the ERRNTR module detects an abnormality, a display of the notation CK NTR is also initiated (see steps 1936 and 1942). To initiate the display, microprocessor 1702 activates terminals P14, RXD, and TXD which in turn activate terminals 1744, 1746 and 1748 respectively which are display latch, serial data, and serial clock as inputs to display circuit 1802 (FIG. 18). Display circuit 1802 then initiates LCD display 1804 for the notation CK NTR, according to known conventional techniques.

FIG. 21 is a computer program flowchart illustrating the 1 millisecond interrupt (1 MS INT) which, as the name implies, interrupts other modules every 1 millisecond. The program enters at step 2102 to ask whether the timing cycle active flag is set. Assuming this flag is not set the program moves on to step 2104 which asks whether the timing cycle is active now. The timing cycle goes active during the time when a tooth on timing cycle sprocket 88 (FIG. 1) sweeps by timing cycle sensor 86 which causes terminal 1626 (FIG. 16) to go low for a brief time which is indicated as signal TMG CYC to terminal PB6 of RAM 1714 (FIG. 17). If during this pass through module 1 MS INT, the timing cycle is active, the program moves to step 2106 to decrement the timing cycle counter and to set the timing cycle active flag. The program then moves on to step 2108. If the timing cycle is not active in step 2104, the program bypasses step 2106 and moves directly to step 2108.

Step 2108 asks whether the stuffer cycle flag is set. Assuming this flag is not set, the program moves to step 2110 which asks whether the stuffer cycle is active now. As with the timing cycle, the stuffer cycle goes active each time the magnet on stuffer arm 20 sweeps by stuffer cycle sensor 84 which causes terminal 1524 to go low briefly which microprocessor 1700 reads at terminal TO as signal STF CYC. If the stuffer cycle is active, the program moves to step 2112 to increment the stuffer cycle counter and to set the stuffer cycle active flag. The program then exits. If, in step 2110, the stuffer cycle is not active, the program exits module 1 MS INT.

During the next pass through module 1 MS INT, the program sees the timing cycle active flag set in step 2102 and moves to step 2114 to ask whether the timing cycle is active now. If yes, the program moves on to step 2108, bypassing step 2106, so that the timing cycle counter is decremented only once for each activation of the timing cycle sensor. If, in step 2114, the timing cycle is not active now, indicating that terminal 1626 (FIG. 16) has gone high, the program moves to step 2116 to clear the timing cycle active flag in preparation for the next timing cycle. The program then moves on to step 2108 in which the stuffer cycle flag is set from the previous pass through this module, and the program moves on to step 2118 which asks whether the stuffer cycle is active now. If yes, the program exits thereby bypassing step 2112 so that the stuffer cycle counter is not incremented a second time for one stuffer cycle activation at terminal 1524.

If the stuffer cycle is not active now in step 2118, the program moves on to step 2120 to clear the stuffer cycle active flag in preparation for the next stuffer cycle pulse on stuffer cycle sensor D.

We claim:

1. In combination with a crop baler having a mechanism for binding crop bales produced by the baler with at least one strand of binding material, the binding mechanism including:
    a shiftable, yieldably biased slacker arm engaged with the strand for taking up slack in the strand,
    a knotter for attaching together respective strand ends, and
    needle means for bringing respective strand ends into juxtaposition for attaching together by the knotter, the binding mechanism cycling through a binding cycle during which the slacker arm shifts between first and second positions, the arm normally shifting from the first to the second position immediately after the knotter attaches together the strand ends and subsequently shifting from the second to the first position, a means for monitoring the operation of the binding mechanism, said monitoring means comprising:
  means for detecting slacker arm position;
  means for sensing the cycling of the binding cycle;
  means operably coupled with said detecting means and with said sensing means for determining whether there has been a failure of the slacker arm to shift between the first and second positions during the binding cycle; and
  means operably coupled with said determining means for displaying a visual representation indicative of said failure upon the occurrence of said failure.

2. In combination with a crop baler as claimed in claim 1, said determining means including a computer.

3. In combination with a crop baler as claimed in claim 2, said detecting means including means for producing and sending a first signal indicative of said slacker arm position to said computer, said binding cycle having a beginning and an ending, said sensing means including:
  means for sensing said beginning of the binding cycle and for producing and sending a second signal indicative of said beginning to said computer, and
  means for sensing said ending of the binding cycle and for producing and sending a third signal indicative of said ending to said computer,
  said computer being responsive to said first, second, and third signals for determining said failure and for producing and sending a failure signal indicative of said failure to said display means,
  said displaying means being responsive to said failure signal for displaying said visual representation.

4. In combination with a crop baler as claimed in claim 3, the needle means being shiftable between a home position and an operating position, said beginning occurring when the needle means leaves the home position, said means for sensing said beginning including means for sensing when the needle means leaves the home position.

5. In combination with a crop baler as claimed in claim 4, said means for sensing when the needle means leaves the home position including an electrical switch.

6. In combination with a crop baler as claimed in claim 3, the baler having a rotatable drive mechanism mechanically interlinked with said needle means, said ending occurring upon a predetermined number of revolutions of the drive mechanism occurring after said beginning, said means for sensing said ending including means for sensing said predetermined number of revolutions of the drive mechanism.

7. In combination with a crop baler as claimed in claim 6, said means for sensing said predetermined number including an activatable sensor activated during revolution of the drive mechanism.

8. In combination with a crop baler as claimed in claim 3, said displaying means including liquid crystal indicia.

9. In combination with a crop baler as claimed in claim 3, the binding mechanism including a plurality of slacker arms shiftable between respective first and second positions and a corresponding plurality of knotters and strands respectively associated therewith, the plurality of slacker arms being potentially shiftable different distances from the respective second positions, said detecting means further including
  an elongated shiftable rod disposed transversely with respect to the slacker arms;
  means yieldably biasing said rod into contact with the slacker arm that is shifted the furthermost distance away from the second position in a direction toward the first position, and
  an electrical switch electrically coupled with said computer activated by said rod when said furthermost slacker arm is in the second position.

10. In combination with a crop baler as set forth in claim 1, the slacker arm being normally held by the strand against shifting by the yieldable bias of the arm to a released position, the yieldable bias shifting the arm to the released position when the strand is in an excessive slack condition, the presence of the arm in the released position after the baler has formed a beginning portion of a bale being indicative of an abnormal condition concerning the binding mechanism, said monitoring means further including:
  means operably coupled with said determining means for detecting the slacker arm in the released position, and
  means operably coupled with said determining means for detecting whether the baler has formed said beginning portion,
  said determining means being further operable for determining the abnormal condition by determining whether the arm is in the released position after the baler has formed said beginning portion,
  said displaying means being further operable for displaying a visual representation indicative of said abnormal condition upon the occurence of said abnormal condition.

11. In combination with a crop baler having a mechanism for binding crop bales produced by the baler with at least one strand of binding material, the binding mechanism cycling through a binding cycle during which the strand progresses from a first slack condition to a second slack condition and returns to the first slack condition, means for monitoring the operation of the binding mechanism comprising:
  means for detecting the slack condition of the strand;
  means for sensing the cycling of the binding mechanism;
  means operably coupled with said detecting and sensing means for determining whether there has been a failure of the strand to progress between the first and second slack conditions during the binding cycle, and
  means operably coupled with said determining means for displaying a visual representation indicative of said failure upon the occurrence of said failure.

12. The monitoring system as set forth in claim 11, said determining means including a computer.

13. The monitoring system as set forth in claim 12, the binding mechanism including a plurality of strands and a corresponding plurality of shiftable, yieldably biased, slacker arms respectively associated therewith for taking up slack in the strands, the slacker arms normally shifting between first and second positions corresponding respectively to the first and second slack conditions during the binding cycle, the slacker arms being potentially shiftable different distances from the respective second positions, said detecting means including
  an elongated shiftable rod disposed transversely with respect to the slacker arms,
  means yieldably biasing said rod into contact with the slacker arm that is shifted the furthermost distance away from the second position toward the first position, and and electrical switch electrically coupled with said computer and activated by said rod when the furthermost slacker arm is in the second position for producing and sending a signal indicative of the position of the furthermost slacker arm to said computer.

14. The monitoring system as set forth in claim 12, the binding mechanism including a needle means for bringing respective ends of the strand into juxtaposition with one another and with a knotter or the like for attaching together the strand ends, the needle means being shiftable between a home position and an operating position, the binding cycle beginning when the needle means leaves the home position, said sensing means including an electrical switch electrically coupled with said computer and activated by the needle means for producing and sending a signal indicative of the beginning of the binding cycle to said computer.

15. In combination with a crop baler having a mechanism for binding crop bales produced by the baler from charges of crop material with at least one strand of binding material, the strand progressing to an abnormal condition in the event of certain abnormal occurences associated with the operation of the binding mechanism, means for monitoring the condition of the strand comprising:

a computer;

means for detecting said abnormal strand conditions including means operably coupled with said computer for producing and sending a first signal indicative of said abnormal strand condition to said computer; and means operably coupled with said computer for displaying a visual representation indicative of said abnormal strand condition, said computer being responsive to said first signal for producing and sending a second signal to said displaying means, said displaying means being responsive to said second signal for displaying said visual representation.

16. The monitoring means as set forth in claim 15, further including means for determining when the baler has formed a predetermined beginning portion of a bale and for producing a third signal indicative of the formation of said beginning portion, said computer being operably coupled with said determining means for receiving said third signal, said computer sending said second signal to said displaying means only in response to both said first and third signals.

17. The monitoring means as set forth in claim 16, the binding mechanism cycling through a binding cycle wherein a crop bale is bound by a strand, the baler including a shiftable stuffer device by which successive shifting movements thereof feed corresponding charges of crop material into the baler for bale formation therefrom, said predetermined beginning portion of the next bale corresponding to a predetermined number of shifting movements of the stuffer device occurring after the end of the binding cycle, said determining means including means for sensing the ending of the binding cycle and for detecting said predetermined number of shifting movements occurring after the binding cycle ending in order to determine when the baler has produced said beginning portion.

18. In a crop baler having a mechanism operable for binding crop bales produced by the baler with at least one strand of binding material, the binding mechanism cycling through a binding cycle during which the strand progresses from a first slack condition to a second slack condition and subsequently to the first slack condition, a method for monitoring the operation of the binding mechanism comprising the steps of:

detecting the slack condition of the strand;

sensing the cycling of the binding mechanism;

determining the slack condition of the strand and the cycling of the binding mechanism with respect to whether there has been a failure of the strand to progress between the first and second conditions during the binding cycle; and displaying a visual representation indicative of said failure upon the occurrence of said failure.

19. The method as set forth in claim 18, said determining step including the step of using a computer to determine whether there has been said failure.

20. The method as set forth in claim 19, said detecting step including the step of producing and sending a signal indicative of the slack condition of the strand to said computer.

21. The method as set forth in claim 19, said sensing step including the step of producing and sending signals indicative of the beginning and ending of the binding cycle to said computer.

22. In a crop baler having a mechanism for binding crop bales produced by the baler from charges of crop material with at least one strand of binding material, the strand progressing to an abnormal strand condition in the event of certain abnormal occurrences associated with the operation of the binding mechanism, a method of monitoring the condition of the strand comprising:

detecting said abnormal strand condition;

producing and sending a first signal indicative of said abnormal stand condition to a computer;

producing a second signal in said computer and sending said second signal to a display means in response to reception of said first signal by said computer, and displaying a visual representation indicative of said abnormal strand condition with said display means in response to reception of said second signal.

23. The method as set forth in claim 22, further including the steps of:

determining when the baler has formed a predetermined beginning portion of a bale;

producing and sending a third signal indicative of the formation of said beginning portion to said computer; and sending said second signal to said displaying means only in response to reception of both said first and third signals by said computer.

24. The method as set forth in claim 23, the binding mechanism cycling through a binding cycle wherein a crop bale is bound by a strand, the baler including a shiftable stuffer device by which successive shifting movements thereof feed corresponding charges of crop material into the baler for bale formation therefrom, said predetermined beginning portion of the next bale corresponding to a predetermined number of shifting movements of the stuffer device occurring after the end of the binding cycle, said determining step further including the steps of:

sensing the ending of the binding cycle, and detecting said predetermined number of shifting movements occurring after the binding cycle ending in order to determine when the baler has produced said beginning portion.

* * * * *